Patented Sept. 20, 1938

2,130,527

UNITED STATES PATENT OFFICE 2,130,527

HYDROXY-ALKYL ETHERS OF HYDROXY-DIPHENYL COMPOUNDS

Gerald H. Coleman and John Zemba, Midland, Mich., assignors to The Dow Chemical Company, Midland, Mich., a corporation of Michigan No Drawing. Application February 23, 1937, Serial No. 127,176

11 Claims. (Cl. 260—150)

This invention relates to the hydroxy-alkyl ethers of hydroxy-diphenyl compounds having the formula:

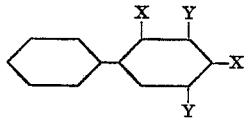

in which one Y represents chlorine, bromine, or an alkyl radical containing from 1 to 8, inclusive, carbon atoms; the other Y represents chlorine, bromine, an alkyl radical containing from 1 to 8, inclusive, carbon atoms, or hydrogen; one X represents hydrogen; and the other X represents a hydroxy-alkoxy radical having the formula

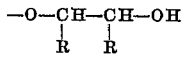

wherein each R represents hydrogen or methyl, and the sum of the carbon atoms is not greater than 3.

We have prepared members of the above new class of compounds, determined certain of their physical properties whereby they can readily be identified, and have found them useful as plasticizers in cellulose derivative compositions, as intermediates in the preparation of pharmaceutical derivatives, and particularly as toxics for inclusion in fly-spray compositions.

These compounds are high-boiling, complex derivatives obtained as viscous liquids or white, crystalline solids. They are substantially insoluble in water but somewhat soluble in dilute aqueous alkaline solutions and most organic solvents.

These new compounds can be prepared by reacting an aqueous solution of an alkali metal salt of a suitable hydroxy-diphenyl compound with a halo-hydrin, e. g. ethylene chlorohydrin, propylene bromohydrin, etc.

In preparing the new compounds above-described, we generally warm an aqueous solution of an alkali metal salt of the hydroxy-diphenyl compound to its refluxing temperature and add thereto a halo-hydrin, although, if desired, the hydroxy-diphenyl compound and halo-hydrin may be mixed together and a suitable alkali, e. g. NaOH or KOH, subsequently added thereto. While the phenolate and the halo-hydrin can be reacted together in any desired proportions, high yields of the hydroxy-alkyl ethers can be obtained when equimolecular proportions of the reactants are used. The reaction mixture is stirred at the refluxing temperature until the reaction is substantially complete, after which the mixture is cooled and allowed to stand, whereby an oily layer separates. This oily layer may be fractionally distilled to separate the desired ether compounds in substantially pure form or it may be used without further purification as, for example, in the preparation of fly-spray compositions. In certain cases where the hydroxy-diphenyl compounds employed form alkaline metal salts which are relatively insoluble in water, it is convenient to employ sufficient alcohol or other water miscible organic solvent in the reaction mixture to dissolve the major portion of the reactants.

Our new compounds may also be prepared by reacting the hydroxy-diphenyl compounds with alkylene oxides in the presence of suitable catalysts, e. g. sulphuric acid.

The following examples describe in detail the preparation of certain individual members of our new class of compounds, but are not to be construed as limiting the invention:

Example 1

429 grams (2 mols) of a mixture of isomeric monochloro-2-hydroxy-diphenyls (consisting of approximately 80 per cent by weight of 2-hydroxy-3-chloro-diphenyl and 20 per cent of 2-hydroxy-5-chloro-diphenyl), 80 grams (2 mols) of sodium hydroxide, and 200 milliliters of water were mixed together and warmed to the refluxing temperature of the mixture. 192 grams of a 42 per cent aqueous azeotrope of ethylene chlorohydrin was slowly run into the refluxing reaction mixture with constant stirring. Heating was continued for one hour, after which the mixture was allowed to stand while an oily layer separated therefrom. The latter was fractionally distilled under reduced pressure, whereby there was obtained 247 grams of a beta-hydroxy-ethyl ether of 2-hydroxy-3-chloro-diphenyl product, boiling at 195°–198° C. at 5 to 6 millimeters pressure. This product was recrystallized from 95 per cent ethanol to obtain substantially pure beta-hydroxy-ethyl ether of 2-hydroxy-3-chloro-diphenyl having a melting point of 125.5°–126.5° C. This is a white crystalline compound substantially insoluble in water and soluble in most common organic solvents.

Example 2

In a similar manner 2-hydroxy-3,5-dichloro-diphenyl, sodium hydroxide, water, and ethylene chlorohydrin were reacted together to obtain the beta-hydroxy-ethyl ether of 2-hydroxy-3,5-dichloro-diphenyl as a viscous water white liquid boiling at 181°–183° C. at 4 to 5 millimeters pressure, and having a specific gravity of 1.2873 at 20°/4° C.

*Example 3*

0.14 mol. of 2-hydroxy-3,5-di-tertiary-butyl-diphenyl 0.14 mol. of sodium hydroxide, 0.14 mol. of ethylene chlorohydrin as a 42 per cent aqueous azeotrope, and 100 milliliters of 95 per cent ethanol were reacted together at the refluxing temperature of the reaction mixture. The crude reaction product was diluted with water, whereby an oily layer separated therefrom. Fractional distillation of this oily layer resulted in the isolation of the beta-hydroxy-ethyl ether of 2-hydroxy-3,5-di-tertiary-butyl-diphenyl as a viscous, yellow liquid boiling at 200°–205° C. at 6 millimeters pressure and having a specific gravity of 1.0003 at 65°/4° C.

*Example 4*

In a similar manner 1 mol. of 2-hydroxy-3-chloro-diphenyl, 1 mol. of propylene chlorohydrin as a 51 per cent aqueous azeotrope, and 1 mol. of sodium hydroxide were reacted together in 250 milliliters of 30 per cent by weight aqueous ethanol. Upon crystallization of the oily layer from 95 per cent ethanol, 186 grams of the hydroxy-propyl ether of 2-hydroxy-3-chloro-diphenyl was obtained as a white crystalline product melting at 128.5°–129.5° C.

Other compounds prepared in a similar manner include the following:

Beta-hydroxy-ethyl ether of 2-hydroxy-5-chloro-diphenyl, a water white liquid boiling at 157°–161° C. at 4 millimeters pressure, and having the specific gravity 1.2244;

Beta-hydroxy-ethyl ether of 2-hydroxy-5-isopropyl-diphenyl, a white crystalline compound boiling at 182°–183° C. at 5 millimeters pressure, and having the specific gravity 1.0503 at 65°/4° C.;

Beta-hydroxy-ethyl ether of 3-bromo-4-hydroxy-diphenyl, a white crystalline solid melting at 74.5°–75.5° C., and boiling at 220°–225° C. at 6 millimeters pressure;

Hydroxy-propyl-ether of 2-hydroxy-5-isopropyl-diphenyl, a water white liquid boiling at 166°–168° C. at 4 millimeters pressure and having a specific gravity of 1.0475 at 20°/4° C.;

Hydroxy-propyl ether of 2-hydroxy-3,5-dichloro-diphenyl, a viscous liquid boiling at 173°–176° C. at 4 millimeters pressure, and having a specific gravity of 1.270 at 20°/4° C.;

Hydroxy-propyl ether of 3-bromo-4-hydroxy-diphenyl, a white crystalline solid boiling at 200°–205° C. at 4 millimeters pressure, and melting at 82°–83° C.

Among other hydroxy-alkyl ethers of hydroxy-diphenyl compounds falling within the scope of our invention which may be prepared according to the above described procedures are: beta-hydroxy-ethyl ether of 2-hydroxy-3-bromo-diphenyl; beta-hydroxy-ethyl ether of 2-hydroxy-5-bromo-diphenyl; beta-hydroxy-ethyl ether of 2-hydroxy-3,5-dibromo-diphenyl; beta-hydroxy-ethyl ether of 4-hydroxy-3-chloro-diphenyl; beta-hydroxy-ethyl ether of 4-hydroxy-3,5-dichloro-diphenyl; beta-hydroxy-ethyl ether of 4-hydroxy-3,5-dibromo-diphenyl; beta-hydroxy-ethyl ether of 2-hydroxy-3-chloro-5-bromo-diphenyl; beta-hydroxy-ethyl ether of 4-hydroxy-3-bromo-5-chloro-diphenyl; hydroxy-propyl ether of 2-hydroxy-3-bromo-diphenyl; hydroxy-propyl ether of 2-hydroxy-5-bromo-diphenyl; hydroxy-propyl-ether of 2-hydroxy-3,5-dibromo-diphenyl; hydroxy-propyl ether of 4-hydroxy-3-chloro-diphenyl; hydroxy-propyl ether of 4-hydroxy-3,5-dichloro-diphenyl; hydroxy-propyl ether of 4-hydroxy-3-bromo-5-chloro-diphenyl; beta-hydroxy-ethyl ether of 2-hydroxy-5-tertiary-butyl-diphenyl; beta-hydroxy-ethyl ether of 2-hydroxy-3-tertiary-butyl-diphenyl; beta-hydroxy-ethyl ether of 2-hydroxy-3-normal-butyl-diphenyl; beta-hydroxy-ethyl ether of 2-hydroxy-5-methyl-diphenyl; beta-hydroxy-ethyl ether of 2-hydroxy-5-tertiary-amyl-diphenyl; beta-hydroxy-ethyl ether of 2-hydroxy-5-iso-hexyl-diphenyl; beta-hydroxy-ethyl ether of 2-hydroxy-5-iso-heptyl-diphenyl; beta-hydroxy-ethyl ether of 2-hydroxy-5-tertiary-octyl-diphenyl; beta-hydroxy-ethyl ether of 4-hydroxy-3-methyl-diphenyl; beta-hydroxy-ethyl ether of 4-hydroxy-3-ethyl-diphenyl; beta-hydroxy-ethyl ether of 4-hydroxy-3-propyl-diphenyl; beta-hydroxy-ethyl ether of 4-hydroxy-3-secondary-butyl-diphenyl; hydroxy-propyl ether of 2-hydroxy-5-tertiary-butyl-diphenyl; hydroxy-propyl ether of 2-hydroxy-5-methyl-diphenyl; hydroxy-propyl ether of 2-hydroxy-3-tertiary-butyl-diphenyl; hydroxy-propyl ether of 2-hydroxy-5-normal-butyl-diphenyl; hydroxy-propyl-ether of 2-hydroxy-5-tertiary-octyl-diphenyl; hydroxy-propyl ether of 4-hydroxy-3-methyl-diphenyl; hydroxy-propyl-ether of 4-hydroxy-3-normal-propyl-diphenyl; beta-hydroxy-ethyl ether of 2-hydroxy-3-chloro-5-methyl-diphenyl; beta-hydroxy-ethyl ether of 2-hydroxy-3-normal-propyl-5-bromo-diphenyl; beta-hydroxy-ethyl ether of 2-hydroxy-3-chloro-5-tertiary-butyl-diphenyl; beta-hydroxy-ethyl ether of 2-hydroxy-3-iso-amyl-5-chloro-diphenyl; beta-hydroxy-ethyl ether of 4-hydroxy-3-secondary-butyl-5-chloro-diphenyl; hydroxy-propyl ether of 2-hydroxy-3-methyl-5-chloro-diphenyl; hydroxy-propyl ether of 2-hydroxy-3-chloro-5-normal-propyl-diphenyl; hydroxy-propyl ether of 2-hydroxy-3-tertiary-butyl-5-bromo-diphenyl; hydroxy-propyl ether of 4-hydroxy-3-iso-butyl-5-bromo-diphenyl; beta-hydroxy-ethyl ether of 2-hydroxy-3-methyl-5-tertiary-butyl-diphenyl; beta-hydroxy-ethyl ether of 2-hydroxy-3,5-di-secondary-amyl-diphenyl; beta-hydroxy-ethyl ether of 4-hydroxy-3,5-di-methyl-diphenyl; beta-hydroxy-ethyl ether of 4-hydroxy-3,5-di-tertiary-amyl-diphenyl; hydroxy-propyl ether of 2-hydroxy-3-tertiary-butyl-5-methyl-diphenyl; hydroxy-propyl ether of 2-hydroxy-3,5-di-isopropyl-diphenyl; hydroxy-propyl ether of 4-hydroxy-3-methyl-5-tertiary-octyl-diphenyl, etc.

Representative members of the above-described group of compounds have been tested by the Peet-Grady method as described in Soap, 8, No. 4, 1932, and found to be particularly valuable as fly spray toxics. For example, a 5 per cent kerosene solution of beta-hydroxy-ethyl ether of 2-hydroxy-3,5-dichloro-diphenyl was found to give an 83 per cent knock-down and a kill of over 46 per cent in 24 hours. 5 per cent kerosene solutions of beta-hydroxy-ethyl ether of 2-hydroxy-5-isopropyl-diphenyl and of hydroxy-propyl ether of 2-hydroxy-5-isopropyl-diphenyl gave kills of 20 and 25 per cent, respectively, when tested in a similar manner.

This application is a continuation in part of our co-pending application Serial No. 126,809, filed February 20, 1937.

Other modes of applying the principle of our invention may be employed instead of those explained, change being made as regards the materials employed provided the products described in the following claims be thereby obtained.

We, therefore, particularly point out and distinctly claim as our invention:

1. A compound having the formula:

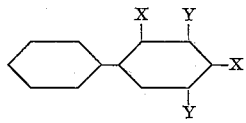

in which one Y represents a substituent selected from the group consisting of chlorine, bromine, and an alkyl radical containing from 1 to 8 carbon atoms, inclusive; the other Y represents a substituent selected from the group consisting of hydrogen, chlorine, bromine and an alkyl radical containing from 1 to 8 carbon atoms, inclusive; one X represents hydrogen; and the other X represents a hydroxy-alkoxy radical having the formula:

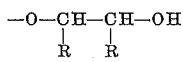

wherein each R represents a substituent selected from the group consisting of methyl and hydrogen, and the sum of the carbon atoms in the hydroxy-alkoxy radical is not greater than 3.

2. A compound having the formula:

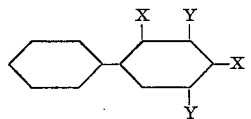

in which one Y represents a substituent selected from the group consisting of chlorine, bromine, and an alkyl radical containing from 1 to 8 carbon atoms, inclusive; the other Y represents a substituent selected from the group consisting of hydrogen, chlorine, bromine, and an alkyl radical containing from 1 to 8 carbon atoms, inclusive; one X represents hydrogen; and the other X represents the beta-hydroxy-ethoxy radical.

3. A compound having the formula:

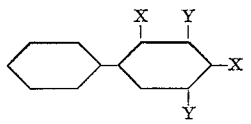

in which one Y represents a substituent selected from the group consisting of chlorine, bromine, and an alkyl radical containing from 1 to 8 carbon atoms, inclusive; the other Y represents a substituent selected from the group consisting of hydrogen, chlorine, bromine, and an alkyl radical containing from 1 to 8 carbon atoms, inclusive; one X represents hydrogen; and the other X represents a hydroxy-propyloxy radical having the formula:

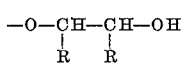

wherein one R represents methyl and the other R represents hydrogen.

4. A compound having the formula:

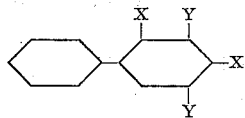

in which each Y represents halogen; one X represents hydrogen; and the other X represents a hydroxy-alkoxy radical having the formula:

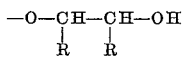

wherein each R represents a substituent selected from the group consisting of hydrogen and methyl and the sum of the carbon atoms in the hydroxy-alkoxy radical is not greater than 3.

5. A compound having the formula:

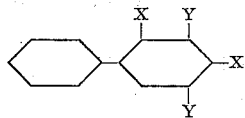

in which each Y represents an alkyl group containing from 1 to 8 carbon atoms, inclusive; one X represents hydrogen; and the other X represents a hydroxy-alkoxy radical having the formula:

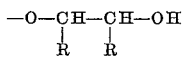

wherein each R represents a substituent selected from the group consisting of hydrogen and methyl and the sum of the carbon atoms in the hydroxy-alkoxy radical is not greater than 3.

6. A compound having the formula:

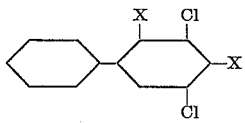

in which one X represents hydrogen; and the other X represents a hydroxy-alkoxy radical having the formula:

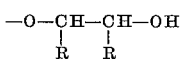

wherein each R represents a substituent selected from the group consisting of hydrogen and methyl and the sum of the carbon atoms in the hydroxy-alkoxy radical is not greater than 3.

7. A compound having the formula:

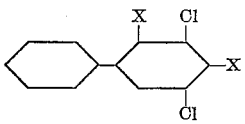

in which one X represents hydrogen, and the other X represents the beta-hydroxy-ethoxy radical.

8. Beta-hydroxy-ethyl ether of 2-hydroxy-3,5-dichloro-diphenyl.

9. A compound having the formula:

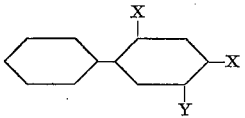

in which Y represents an alkyl group containing from 1 to 8 carbon atoms, inclusive; one X represents hydrogen; and the other X represents a hydroxy-alkoxy radical having the formula:

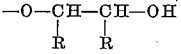

wherein each R represents a substituent selected from the group consisting of hydrogen and methyl and the sum of the carbon atoms in the hydroxy-alkoxy radical is not greater than 3.

10. A compound having the formula:

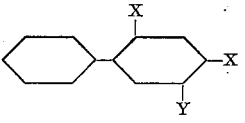

wherein Y represents an alkyl group containing from 1 to 8 carbon atoms, inclusive; one X represents the beta-hydroxy-ethoxy radical; and the other X represents hydrogen.

11. A compound having the formula:

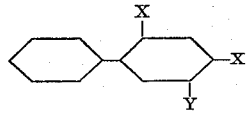

in which Y represents an alkyl radical containing from 1 to 8 carbon atoms, inclusive; one X represents hydrogen; and the other X represents a hydroxy-propyloxy radical having the formula:

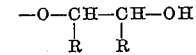

wherein one R represents methyl and the other R represents hydrogen.

GERALD H. COLEMAN.
JOHN ZEMBA.